US 8,780,197 B2

(12) United States Patent
Park et al.

(10) Patent No.: US 8,780,197 B2
(45) Date of Patent: Jul. 15, 2014

(54) APPARATUS AND METHOD FOR DETECTING FACE

(75) Inventors: Dong-ryeol Park, Hwaseong-si (KR); Yeon-ho Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 262 days.

(21) Appl. No.: 12/805,515

(22) Filed: Aug. 3, 2010

(65) Prior Publication Data

US 2011/0058032 A1 Mar. 10, 2011

(30) Foreign Application Priority Data

Sep. 7, 2009 (KR) .................. 10-2009-0084015

(51) Int. Cl.
*H04N 7/18* (2006.01)
*G06K 9/00* (2006.01)

(52) U.S. Cl.
CPC ... *H04N 7/18* (2013.01); *G06K 9/00* (2013.01)
USPC .......................................................... 348/139

(58) Field of Classification Search
USPC .................................................. 348/42–161
See application file for complete search history.

(56) References Cited

U.S. PATENT DOCUMENTS

| 5,937,079 | A * | 8/1999 | Franke ........................ 382/103 |
| 6,658,136 | B1 | 12/2003 | Brumitt | |
| 2004/0208114 | A1 * | 10/2004 | Lao et al. ........................ 369/125 |
| 2005/0063582 | A1 * | 3/2005 | Park et al. ...................... 382/154 |
| 2006/0126941 | A1 | 6/2006 | Higaki | |
| 2009/0141938 | A1 * | 6/2009 | Lim et al. ....................... 382/103 |
| 2009/0262984 | A1 * | 10/2009 | Hildreth et al. ............... 382/103 |
| 2010/0158387 | A1 * | 6/2010 | Choi et al. ..................... 382/195 |

FOREIGN PATENT DOCUMENTS

| JP | 06-147594 | 5/1994 |
| JP | 10-259942 | 9/1998 |
| JP | 2001-033075 | 2/2001 |
| KR | 1995-25366 | 2/1994 |
| KR | 1020010065324 | 7/2001 |
| KR | 1020050114817 | 12/2005 |

OTHER PUBLICATIONS

David Beymer et al., "Real-Time Tracking of Multiple People Using Continuous Detection", Proceedings of the ICCV Frame-rate Workshop, 1999, 8 pages.
Extended European Search Report issued Oct. 9, 2012 in corresponding European Patent Application No. 10175480.2.

* cited by examiner

*Primary Examiner* — Joseph Ustaris
*Assistant Examiner* — Talha Nawaz
(74) *Attorney, Agent, or Firm* — Staas & Halsey LLP (57) ABSTRACT

A face detection apparatus and method are provided. The apparatus may acquire a distance difference image through a stereo camera and create an object mask using the distance difference image to detect a face candidate area. The apparatus may also determine a size of a search window using the distance difference image and detect a facial area in the face candidate area. Accordingly, an operation speed for face detection can be improved.

6 Claims, 6 Drawing Sheets

APPARATUS AND METHOD FOR DETECTING FACE

CROSS-REFERENCE TO RELATED APPLICATIONS

This application claims the benefit under 35 U.S.C. §119 (a) of a Korean Patent Application No. 10-2009-0084015, filed on Sep. 7, 2009, the entire disclosure of which is incorporated herein by reference for all purposes.

BACKGROUND

1. Field

One or more embodiments relate to technology for detecting a facial area in an image.

2. Description of the Related Art

Demand has been increasing for an automation device for detecting a face of a person and finding presence, location, and direction of the person to recognize an identity of the person and provide services specific to people.

Examples of such an automation device include a secure system that recognizes a face of a visitor to a secure entrance, a notebook computer with a camera that senses a face of a user for log-in, and a camera that detects a face to capture a smile. In a face detection technique that has been most widely used recently, a sub-window having several sizes is moved over all areas of an image and portions of the image, detected through the sub-window, are classified as either representing a facial area or a non-facial area.

In this case, classification of the facial area and the non-facial area is performed by a serial classification unit that includes several continuously connected classifiers. That is, when a face is detected in a portion of the image by the classifier in each operation, a process proceeds to a next operation, while when a background is detected in the portion of the image, the process does not proceed to the next operation but a classification of the portion of the image as a background is performed.

This approach is not suitable for inexpensive and/or low-speed processors mainly used in consumer electronics because all areas of the image must be scanned, for example.

SUMMARY

According to one or more embodiments, there is provided an apparatus for detecting a face, including a first distance image acquiring unit to acquire a first distance image for a background based on at least two obtained images, a second distance image acquiring unit to acquire a second distance image for an object and the background based on at least two other obtained images. a distance difference image acquiring unit to acquire a distance difference image between the first distance image and the second distance image, an object mask creator to create an object mask based on the acquired distance difference image, an object area detector to detect an object area from any one image acquired in one of the at least two other obtained images, using the created object mask; and a facial area detector to detect a face in the detected object area.

The apparatus may further include a search window size determiner to calculate a distance to the object based on the acquired distance difference image and determine a size of a search window for face detection in the detected object area based on the calculated distance to the object. In this case, the facial area detector may scan the search window in the detected object area to detect the facial area.

The object mask may be created by eliminating noise from the acquired distance difference image and binarizing the distance difference image with the reduced noise.

According to one or more embodiments, there is provided a method of detecting a face, including, acquiring a first distance image for a background based on at least two obtained images, acquiring a second distance image from a plurality of images for an object and the background based on at least two other obtained images, acquiring a distance difference image between the first distance image and the second distance image, creating an object mask based on the acquired distance difference image, detecting an object area in one of the at least two other obtained images, using the created object mask, and detecting a facial area in the detected object area.

The method may further include calculating a distance to the object based on the acquired distance difference image and determining a size of a search window for face detection in the detected object area based on the calculated distance to the object.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
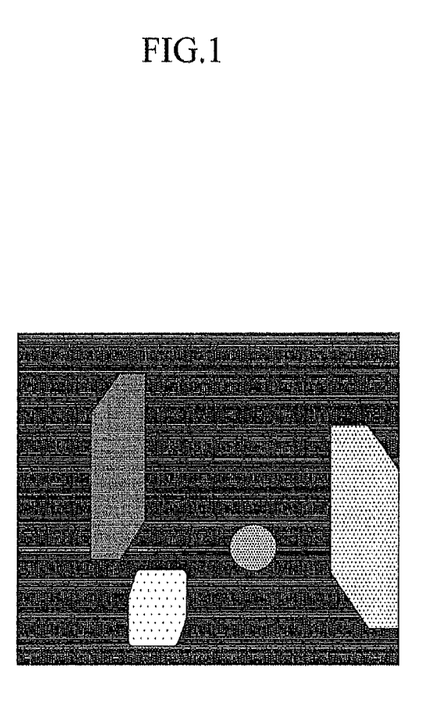
FIG. 1 illustrates a distance image, according to one or more embodiments.

FIG. 1 illustrates a distance image, according to one or more embodiments.

In FIG. 1, the distance image 101 may be defined as an image in which respective points are represented by distance information. In the distance image 101, the distance information may be represented by colors or different shades of gray. For example, the respective points of the distance image 101 may be represented by colors or different shades of gray having different brightness depending on distances.

Figure 2:
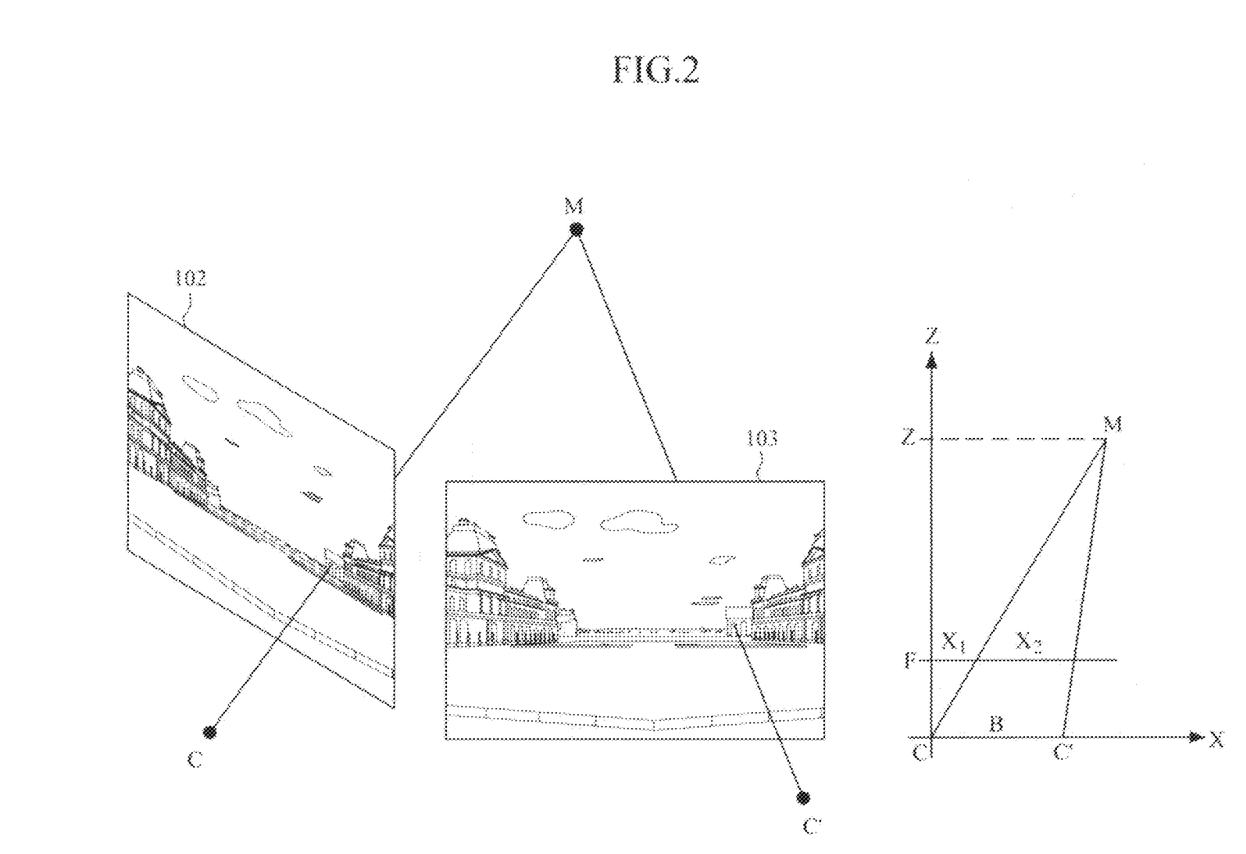
FIG. 2 illustrates a method of acquiring a distance image, according to one or more embodiments.

FIG. 2 illustrates a method of acquiring the distance image, according to one or more embodiments.

In FIG. 2, the distance image may be obtained from first and second images 102 and 103, respectively acquired by left and right cameras of a stereo camera, for example, noting that embodiments are not limited to the use of a stereo camera or the use of two or more cameras. Thus, in an embodiment, the stereo camera may have the left and right cameras combined as in eyes of a person. For example, the left camera may be located at point C and the right camera may be located at point C'. In this case, a distance from the first image 102 or the second image 103 to a specific point M may be obtained by the below Equation 1, for example $$z=(B/d)*F$$ Equation 1:

In Equation 1, with regards to FIG. 2, z denotes the distance from the image to point M, B denotes a distance between point C and point C', d denotes a difference between location coordinates of point M in the respective images (i.e., a difference between $X_1$ and $X_2$), and F denotes a focal length of a camera lens. B may be a constant or a measured value, d may be obtained using a sum of squared difference (SSD) scheme, and F may depend on the camera lens, as only examples. Based on the values, the distances z from each image to the specific point can be obtained.

Thus, the two images 102 and 103 may be acquired by the stereo camera, the distances of the respective points of the images calculated, and the points represented by different colors or shades or gray according to the distances, and thus a distance image such as shown in FIG. 1 can be acquired.

Figure 3:
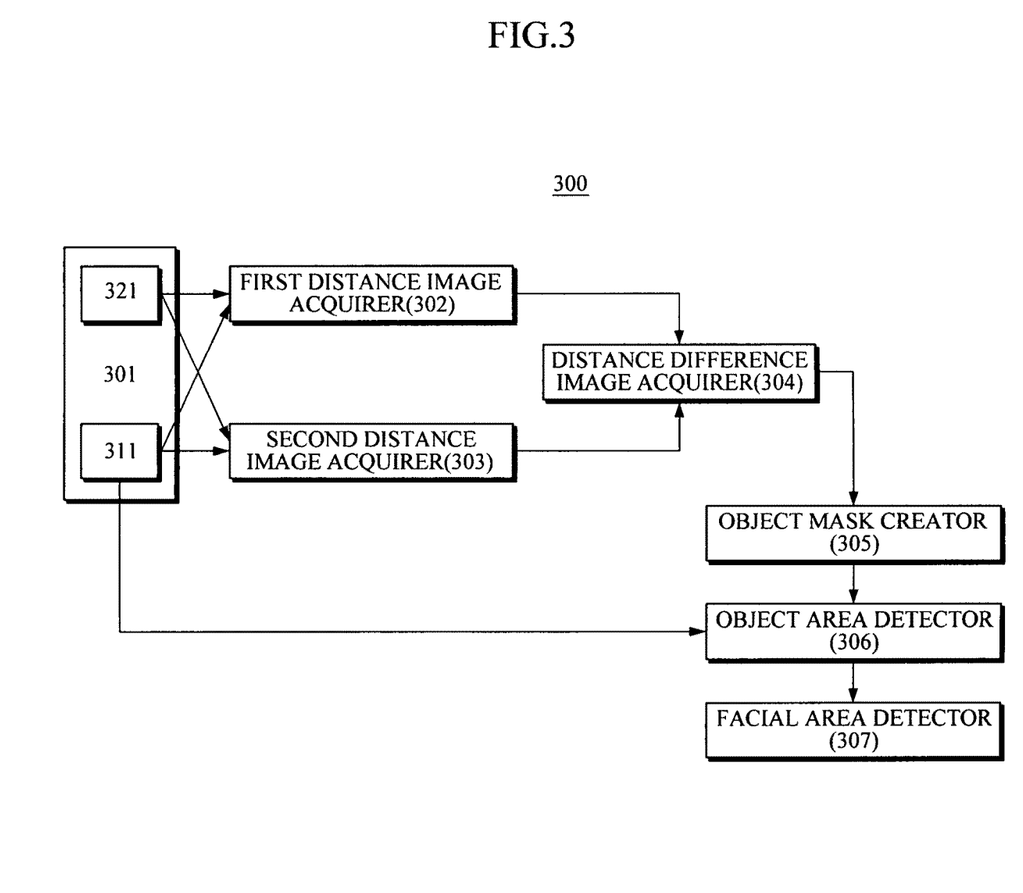
FIG. 3 illustrates a face detection apparatus, according to one or more embodiments.

FIG. 3 illustrates a face detection apparatus, according to one or more embodiments.

Referring to FIG. 3, a face detection apparatus 300 may include a stereo camera 301, a first distance image acquiring unit 302, a second distance image acquiring unit 303, a distance difference image acquiring unit 304, an object mask creator 305, an object area detector 306, and a facial area detector 307, for example.

The stereo camera 301 may have two photographing lenses spaced a certain distance apart to photograph the same object and simultaneously obtain two images. For example, the stereo camera 301 may include an L camera 311 located at the left and an R camera 321 located at the right.

The first distance image acquiring unit 302 acquires a first distance image from a plurality of images for a background acquired from the stereo camera 301. For example, the first distance image acquiring unit 302 may acquire the first distance image for the background using a background image acquired from the L camera 311 and a background image acquired from the R camera 321.

The second distance image acquiring unit 303 acquires a second distance image from a plurality of images for an object and a background acquired from the stereo camera 301. For example, the second distance image acquiring unit 303 may acquire the second distance image for the background and the object using a background and object image acquired from the L camera 311 and a background and object image acquired from the R camera 321. Thus, the first distance image may include only the background, for example, without the object, while the second distance image may include both the background and the object.

Accordingly, a difference between the first distance image and the second distance image is in presence or absence of the object. For example, the first distance image may be acquired when there is only a background without a person, when the object is a person, and the second distance image may be acquired when the person appears over the same background.

The distance difference image acquiring unit 304 acquires a distance difference image based on a comparison between the first distance image and the second distance image. The distance difference image may be obtained by subtracting the first distance image from the second distance image. Alternatively, the distance difference image may be obtained by subtracting the second distance image from the first distance image, noting that alternative comparison techniques may also be available. Since the first distance image includes the background and the second distance image includes the object and the background, the distance difference image may be generated to include only the object without the background.

The object mask creator 305 may eliminate noise in the acquired distance difference image and binarize the distance difference image without the noise to generate an object mask. In an embodiment, the noise may be a portion other than the object created by a distance error, and may be eliminated through a morphology image processing scheme, for example. The binarization may be performed by comparing a distance of each point in the distance difference image without the noise with a threshold value and setting an object area to 0 and other areas to 1. For example, the object mask may correspond to an image filter that has a transparent object area and is opaque in the remaining areas.

Using the created object mask, the object area detector 306 detects the object area in one of images acquired from the stereo camera 301. The image acquired from the stereo camera 301 may be the image from the L camera 311 including an object and a background or the image from the R camera 321 including an object and a background. For example, the object area detector 306 may apply the created object mask to the image from the L camera 311 including the object and the background. As the object mask is applied to the image from the L camera 311 including the object and the background, only the object area of the image may be detected by the object mask.

The facial area detector 307 detects a facial area from the detected object area. A variety of face detection algorithms, such as a boosted cascade scheme for a feature point, may be employed. For example, the facial area detector 307 can detect the facial area by scanning a predetermined search window in the detected object area.

Thus, the face detection apparatus 300 detects a candidate area where the object is likely to exist, through the distance difference image, and may detect the face only in the detected candidate area, thus decreasing the amount of computation required for face detection.

Figure 4:
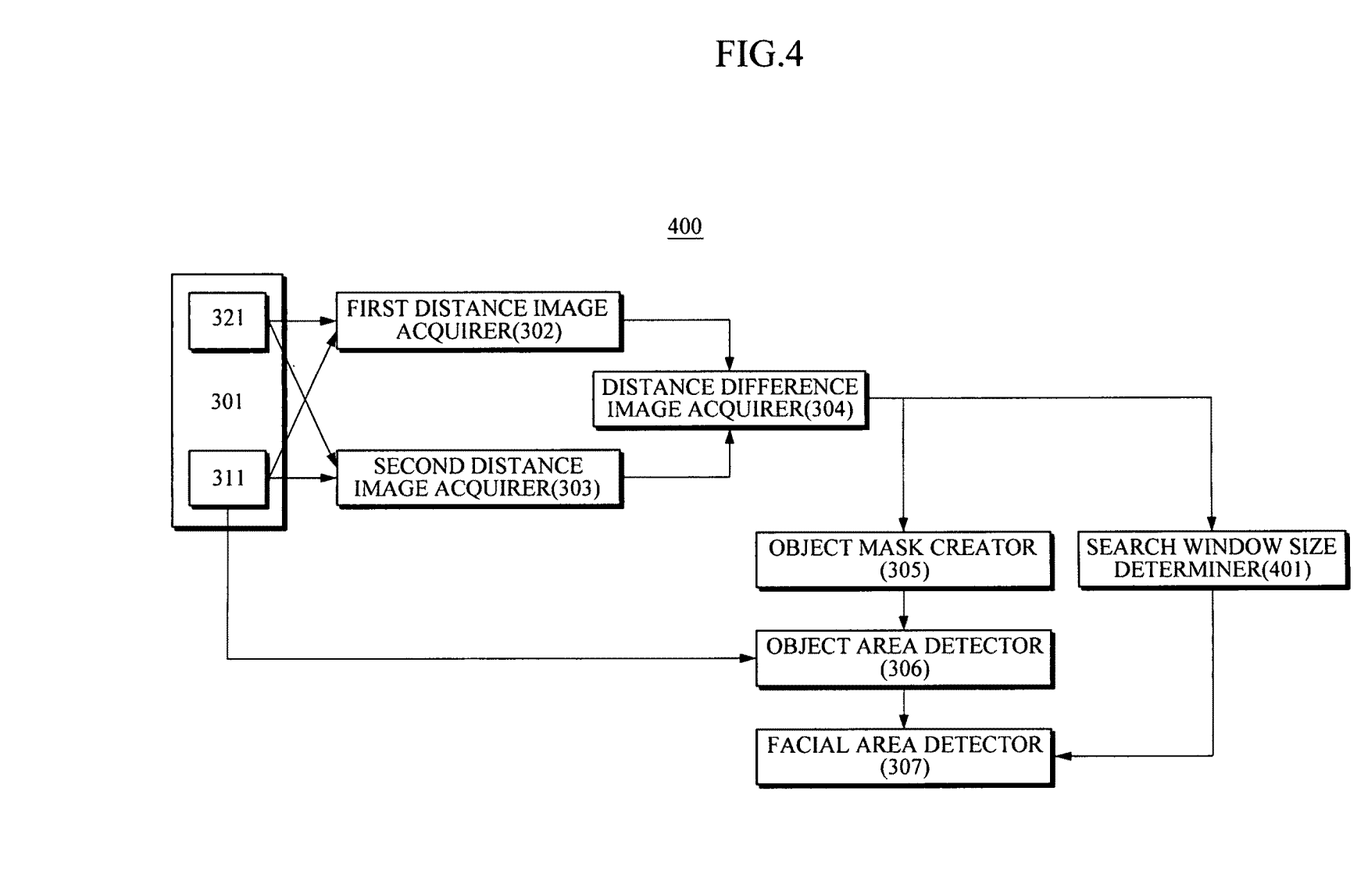
FIG. 4 illustrates a face detection apparatus, according to one or more embodiments.

FIG. 4 illustrates a face detection apparatus, according to one or more embodiments.

In FIG. 4, a face detection apparatus 400 may include a stereo camera 301, a first distance image acquiring unit 302, a second distance image acquiring unit 303, a distance difference image acquiring unit 304, an object mask creator 305, an object area detector 306, a facial area detector 307, and a search window size determiner 401, for example.

The stereo camera 301, the first distance image acquiring unit 302, the second distance image acquiring unit 303, the distance difference image acquiring unit 304, the object mask creator 305, and the object area detector 306 in FIG. 4 may be similar to those illustrated in FIG. 3.

The search window size determiner 401 may calculate a distance to the object based on the distance difference image acquired by the distance difference image acquiring unit 304, and determine a size of a search window for face detection based on the calculated distance to the object.

When an object is a person, because people have similar body ratios, an approximate size of the face may be calculated using a distance to the person. For example, the search window size determiner 401 may calculate the distance to the person using the distance difference image, calculate the size of the face according to a body ratio, and then determine a minimum size and a maximum size of the search window in consideration of the calculated face size.

The facial area detector 307 may scan the search window having the size determined by the search window size determiner 401 in the object area to detect a facial area.

Figure 5:
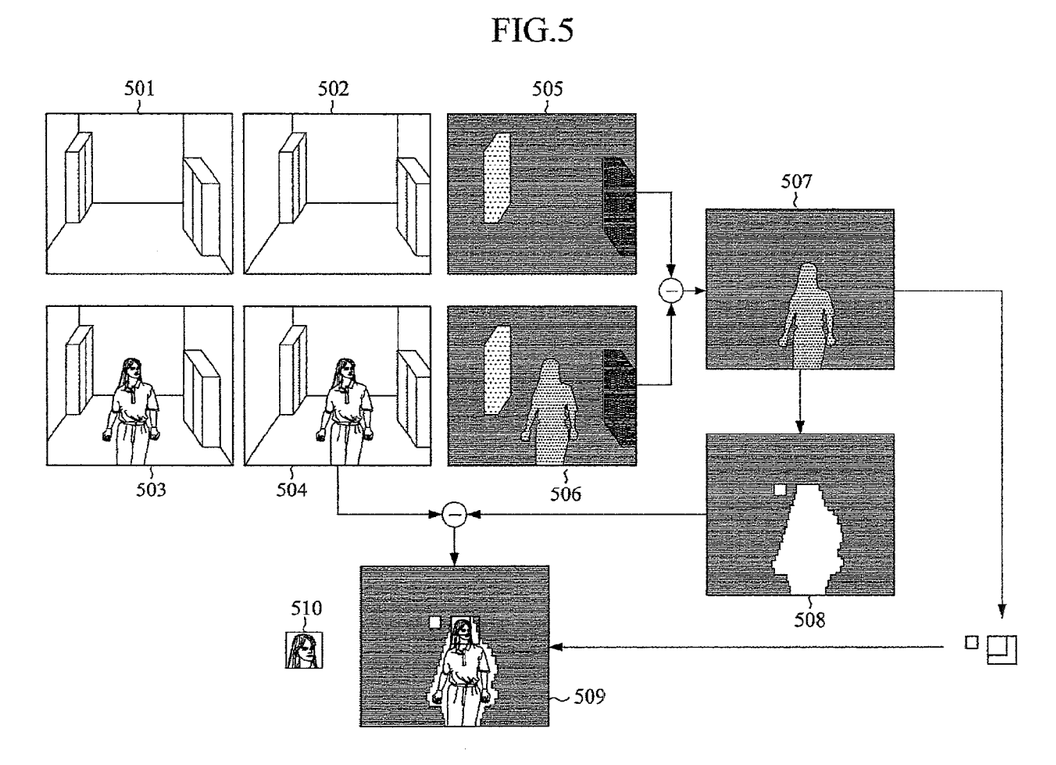
FIG. 5 illustrates images acquired by a face detection apparatus, according to one or more embodiments.

FIG. 5 illustrates images acquired by a face detection apparatus, according to one or more embodiments.

In FIG. 5, a background L image 501 may be an image from the L camera 311 for a background. A background R image 502 may be an image from the R camera 321 for a background. A background+object L image 503 may be the image from the L camera 311 including a background and an object. A background+object R image 504 may be an image for the R camera 321 including a background and an object.

A first distance image 505 may be a distance image for a background obtained from the background L image 501 and the background R image 502. A second distance image 506 may be a distance image for a background and an object obtained from the background+object L image 503 and the background+object R image 504.

A distance difference image 507 may be obtained by subtracting the first distance image 505 from the second distance image 506. In such an embodiment, it can be seen from the distance difference image 507 that only a distance image for the object remains.

The object mask 508 may be an image filter obtained by eliminating noise from the distance difference image 507 and binarizing the resultant distance difference image. Here, it can be seen from the object mask 508 that the object area is represented in white and other areas are represented in black.

A final image 509 may be obtained by applying the object mask 508 to the background+object R image 504. Here, it can be seen from the final image that only the object area has been detected from the background+object R image 504 through the object mask 508.

In this case, a size of the search window may be determined using a distance to the object obtained through the distance difference image 507, for example, and the facial area 510 in the object area may be detected using the search window having the determined size.

Figure 6:
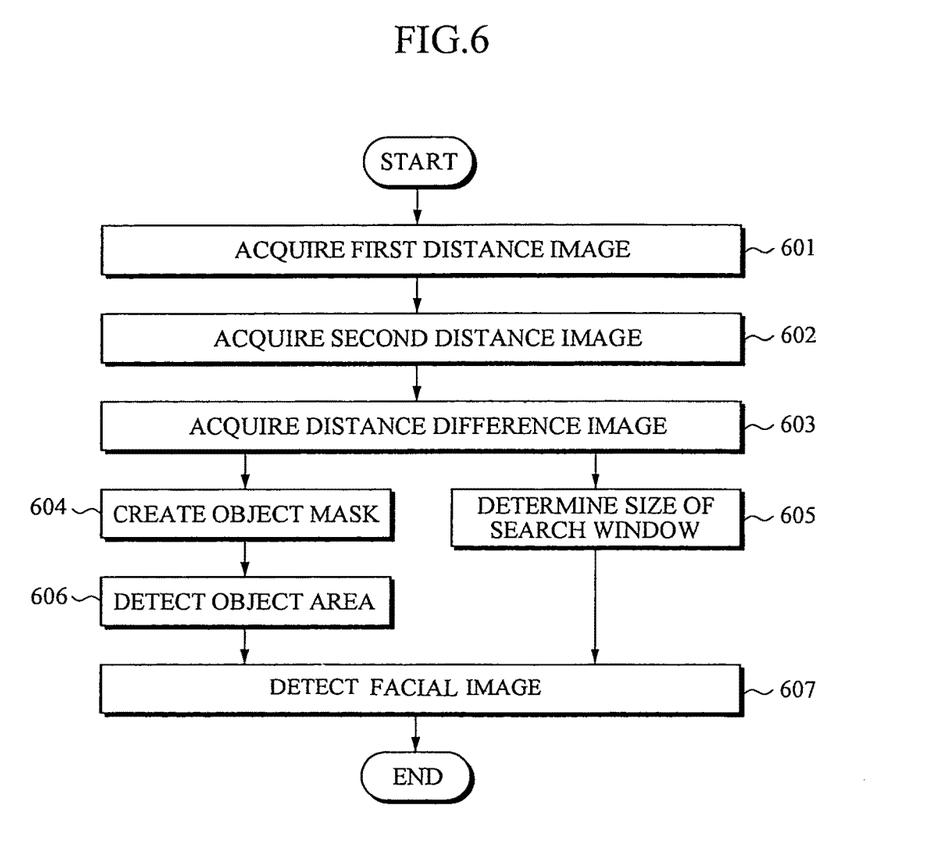
FIG. 6 is a flowchart illustrating a face detection method, according to one or more embodiments.

FIG. 6 is a flowchart illustrating a face detection method, according to one or more embodiments.

Referring to FIG. 6, first, a first distance image is acquired in operation 601. For example, the first distance image acquiring unit 302 may acquire the first distance image 505 using the background L image 501 and the background R image 502. In such a case, the first distance image 505 may include only a background.

A second distance image is acquired in operation 602. For example, the second distance image acquiring unit 303 may acquire the second distance image 506 using the background+object L image 503 and the background+object R image 504. In this case, the second distance image 506 may include a background and a person, e.g., when the object is a person.

A distance difference image is acquired in operation 603. For example, the distance difference image acquiring unit 304 may acquire the distance difference image 507 by subtracting the first distance image 505 from the second distance image 506. In this case, the distance difference image 507 may include only the person.

An object mask may be created in operation 604. For example, the object mask creator 305 may create the object mask 508 by eliminating noise from the distance difference image 507 and binarizing the resultant distance difference image.

Meanwhile, a size of the search window may be determined in operation 605. For example, the search window size determiner 401 may determine a minimum size and a maximum size of the search window using a distance to the object through the distance difference image 507.

An object area may be detected in operation 606. For example, the object area detector 306 may apply the object mask 508 to the background+object R image 504.

A facial area may further be detected in operation 607. For example, the facial area detector 307 may detect the facial area by scanning the search window having the size determined in operation 605, in the detected object area.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of computer readable code include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

Also, one or more of the above-described embodiments may be applied to air conditioners that recognize a three-dimensional location of an object to control a blowing direction, e.g., to control a direction of the cooling air toward an identified object or person.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An apparatus for detecting a face, comprising:
   a first distance image acquiring unit to acquire a first distance image for a background based on at least two obtained images;

a second distance image acquiring unit to acquire a second distance image for an object and the background based on at least two other obtained images;

a distance difference image acquiring unit to acquire a distance difference image between the first distance image and the second distance image;

an object mask creator to create an object mask based on the acquired distance difference image;

an object area detector to detect an object area in one of the at least two other obtained images, using the created object mask; and a facial area detector to detect a face in the detected object area by scanning the detected object area with a search window for face detection whose size is determined based on a distance to the object, wherein the first distance image is acquired when there is only a background without an object, and the second distance image is acquired when an object appears over the same background, and wherein the distance difference image includes the object without the background.

2. The apparatus of claim 1, further comprising a search window size determiner to calculate the distance to the object based on the acquired distance difference image and determine the size of the search window for face detection in the detected object area based on the calculated distance to the object.

3. The apparatus of claim 2, wherein the facial area detector scans the search window in the detected object area to detect the facial area.

4. The apparatus of claim 1, wherein the object mask is created by reducing noise from the acquired distance difference image and binarizing the distance difference image with the reduced noise.

5. A method of detecting a face, comprising:

acquiring a first distance image for a background based on at least two obtained images;

acquiring a second distance image for an object and the background based on at least two other obtained images;

acquiring a distance difference image between the first distance image and the second distance image;

creating an object mask based on the acquired distance difference image;

detecting an object area in one of the obtained at least two other images using the created object mask; and detecting a facial area in the detected object area by scanning the detected object area with a search window for face detection whose size is determined based on a distance to the object, wherein the first distance image is acquired when there is only a background without an object, and the second distance image is acquired when an object appears over the same background, and wherein the distance difference image includes the object without the background.

6. The method of claim 5, further comprising calculating the distance to the object based on the acquired distance difference image and determining the size of the search window for face detection in the detected object area based on the calculated distance to the object.

* * * * *